(12) United States Patent
Harvey et al.

(10) Patent No.: US 7,728,132 B2
(45) Date of Patent: Jun. 1, 2010

(54) COMPOSITIONS FOR STABILIZING CHLORINATED WATER TO SUNLIGHT DECOMPOSITION, AND METHODS OF PREPARATION THEREOF

(75) Inventors: Michael S. Harvey, Modesto, CA (US); Jonathan N. Howarth, Modesto, CA (US)

(73) Assignee: Enviro Tech Chemical Services, Inc., Modesto, CA (US)

( * ) Notice: Subject to any disclaimer, the term of this patent is extended or adjusted under 35 U.S.C. 154(b) by 0 days.

(21) Appl. No.: 11/787,477

(22) Filed: Apr. 16, 2007

(65) Prior Publication Data

US 2008/0255254 A1    Oct. 16, 2008

(51) Int. Cl.
*C07D 251/32* (2006.01)
(52) U.S. Cl. ...................................................... 544/192
(58) Field of Classification Search .................. 544/192
See application file for complete search history.

(56) References Cited

U.S. PATENT DOCUMENTS 4,233,444 A * 11/1980 Doonan et al. ............... 544/192
6,207,177 B1 * 3/2001 Jany ........................... 424/405

* cited by examiner

*Primary Examiner*—Venkataraman Balasubramanian
(74) *Attorney, Agent, or Firm*—Audrey A. Millemann; Weintraub Genshlea at al.

(57) ABSTRACT

The invention includes a composition for stabilizing chlorinated water to sunlight decomposition, and methods of preparing compositions. The composition is a slurry composition of a monoalkali metal cyanurate, of low viscosity. Two methods of preparing the slurry are described, in which cyanuric acid or cyanuric acid wetcake is mixed with a monoalkali metal base. One method dry blends cyanuric acid or cyanuric acid wetcake with a monoalkali metal base. The invention also describes a method of preparing a dry, solid monoalkali metal cyanurate.

12 Claims, No Drawings

COMPOSITIONS FOR STABILIZING CHLORINATED WATER TO SUNLIGHT DECOMPOSITION, AND METHODS OF PREPARATION THEREOF

BACKGROUND OF THE INVENTION

1. Field of the Invention

This invention relates to compositions, and the methods of preparing the compositions, for stabilizing chlorinated water to sunlight decomposition. In particular, the invention includes a monoalkali metal cyanurate slurry and methods for preparing the slurry and a dry solid.

2. Description of the Related Art

For disinfection and biocontrol, chlorine is introduced to many different bodies of water that are exposed to direct sunlight. Examples include outdoor swimming pools, cooling towers, ornamental fountains and wastewater lagoons. There are a variety of ways of chlorinating these waters: sparging with gaseous $Cl_2$; using a chemical delivery pump for liquid sodium hypochlorite (NaOCl) solutions; via erosion feeder for solid, tableted chlorine-donating chemicals such as $Ca(OCl)_2$ and trichlorotriazinetrione; by hand-broadcasting fast-dissolving solid chlorine donating chemicals such as sodium dichlorotriazinetrione and LiOCl; and by electrolytic oxidation of $Cl^-$ ion from NaCl introduced to the water system.

It is well known that, regardless of the way that water is chlorinated, if the water is exposed to strong sunlight the chlorine will quickly disappear because of ultra violet (UV) light-induced photolytic degradation. The half-life of chlorine under such conditions has been estimated to be less than 45 minutes. In the late 1950s, it was discovered that the stability of chlorine to UV degradation could be significantly improved if cyanuric acid was introduced to the water. Cyanuric acid has never been surpassed as a chlorine stabilizer, and today it is still being introduced into chlorinated water for UV stabilization.

Typically, outdoor swimming pools and ornamental fountains are treated with solid or granular forms of cyanuric acid, usually sold in 1 lb. pouches, which the user is instructed to add in the deep end of the pool when the pool is being re-opened for the summer season or being filled with water for the first time. Between 25 and 80 ppm of cyanuric acid in the pool water provides effective UV stabilization properties. Unfortunately, the low solubility of cyanuric acid coupled with the low surface area of the granules means that the cyanuric acid may take several days to dissolve. Lower water temperatures, which may occur when pools are filled for the first time, prolong this dissolution time even further.

The extended time that it takes for cyanuric acid to dissolve in pool water causes several problems. First, the localized high acid condition in the vicinity of the undissolved cyanuric acid can etch or discolor the plaster of newly constructed gunite pools and can cause wrinkling and discoloration of the vinyl of vinyl-lined pools. Second, the pool remains unstabilized to UV decomposition until all the cyanuric acid has dissolved, and biological control is difficult due to the rapid UV degradation of the disinfectant. Third, the aesthetic appearance of the pool is compromised for several days due to piles of undissolved cyanuric acid lying at the bottom of the pool or ornamental water feature. Fourth, the pool owner is unable to operate the pool vacuum during this time because the cyanuric acid would be sucked from the floor of the pool into the filter. The resultant localized low pH condition in the filter and associated equipment would damage or impair the filtration systems and piping.

It has been suggested that the use of monosodium cyanurate will overcome these problems because it has about twice the solubility of cyanuric acid and would be expected to dissolve faster. Compared to cyanuric acid, monosodium cyanurate has a neutral pH and thus does not damage vinyl liners nor etch or discolor the concrete of gunite pools or water features.

The existing methods of producing monosodium cyanurate and the existing products, however, have several disadvantages. In the first place, monosodium cyanurate is not commercially available, probably due to a high cost of production. Production of solid, dry monosodium cyanurate requires the addition of NaOH to a slurry of cyanuric acid, followed by solid-liquid separation, drying, granulation, and screening. U.S. Pat. No. 4,432,959 describes an alternative process for producing the powder form of monosodium cyanurate by mixing solid isocyanuric acid with solid sodium carbonate or bicarbonate in the presence of sufficient water to hydrate the raw material at room temperature. Upon increasing the temperature to 60-100° C., water is liberated from the hydrated raw materials to form the solid monohydrate of monosodium cyanurate. The solid was said to be useful as an active chlorine stabilizer in pool water; however, the method is inefficient in producing large volumes and is still very costly.

Another method of overcoming these high production costs was discussed in U.S. Pat. No. 6,207,177 to Jany. This patent discloses a stable, gel-like 20-40% w/w slurry of monosodium cyanurate monohydrate in water, having a viscosity of 50,000-500,000 mPa s and a pH of 6.5 to 8.5. The method of making the gel involved adding 50% sodium hydroxide solution to a 20-50% slurry of cyanuric acid in water. No solid-liquid separation step was involved. The gel-like properties of the slurry were attributed to the monosodium cyanurate monohydrate crystals having a needle-like appearance with length to diameter ratios between about 5:1 and 20:1. The crystals were described as having formed a tangled mass that held a significant amount of free moisture and gave the gel the appearance of soft-serve ice cream. The slurry was reported to have very fast dissolution in water, making it useful to treat swimming pools, spas, hot tubs, cooling towers, artificial ponds, lagoons, decorative fountains, and other bodies of chlorinated water exposed to direct sunlight. The '177 patent also reports that the gel-like slurry had a tendency to dewater over time as the solids settled to the bottom of the container and that it was possible to decant this liquid layer. In addition, the '177 patent also discloses a potassium cyanurate slurry that did not have the same gel-like properties as the sodium cyanurate slurry and in which the solids separated rapidly.

Although the use of a slurry of monosodium cyanurate would appear to solve the problem of the high cost of production of solid monosodium cyanurate, it results in other problems. The present inventors replicated Example 2 of the '177 patent and produced a gel-like slurry exactly as described therein. It was found, however, that both the freshly-prepared and water-decanted slurries were so thick and viscous that they were of no practical value. In the first place, the slurry was so thick and viscous that it could not be easily pumped out of a reaction vessel into a container. Second, even if the slurry could be put into a container, the end-user would not be able to pour it out of its container into the pool; the user would have to scrape the slurry out with a separate tool or device. Moreover, because the slurries are so heavy and massive, they would immediately sink to the bottom of the pool and remain in an undissolved clump.

The viscosity problems of slurries of monosodium cyanurate monohydrate are evidenced by a product called Instant Pool Water Conditioner by Natural Chemistry of Norwalk, Conn. The product, stated to be a 36% slurry of monosodium cyanurate monohydrate in water, is reported to be instantly dissolving, having a pH of 8, and is asserted to be less damaging to pool surfaces than cyanuric acid. A one-gallon (3.8 liter) sample of this material was purchased from a local pool store. Upon opening the bottle, a volume of approximately two liters of clear water was decanted into a beaker, leaving behind a thick mass of settled solids. Vigorous shaking with additional water managed to dislodge the topmost portion of the compact mass from the container. After about 10 minutes of shaking, it was observed that the remainder was compacted into a solid, hard mass about the size of a fist. This mass could not be removed from the container.

Thus, there is clearly a need for a monosodium cyanurate formulation and method of manufacture that do not suffer from the above-mentioned problems. An ideal slurry product should: (1) be pourable into and out of its container; (2) not settle or compact to a hard mass at the bottom of the container; (3) not readily dewater (separate) in the container; (4) dispense and dissolve readily in the water to which it is added; and (5) be inexpensive and easy to manufacture. The methods and composition of the invention address these needs.

SUMMARY OF THE INVENTION

The invention includes methods for producing a slurry and a dry solid of a monoalkali metal cyanurate that can be added to chlorinated water to stabilize the chlorine against UV degradation. The invention also includes a slurry composition of a monoalkali metal cyanurate. The slurry composition is low in viscosity, making it thin enough to be of practical value—it is pourable from any standard container and can be processed so that little is wasted by sticking to the equipment and reaction vessels. Moreover, the instant slurry composition resists settling or separation from the liquid phase, providing the end-user with a convenient and efficient product. Additionally, the slurry and dry solid compositions dispense and dissolve readily in water and are inexpensive and easily manufactured.

The first embodiment is a method for preparing a slurry of a monoalkali metal cyanurate in water. A cyanuric acid wetcake is made into a slurry and reacted with either a solution of, or solid, monoalkali metal base. Monoalkali metal cyanurate is separated as a wetcake by solid-liquid separation. Next, the monoalkali metal cyanurate wetcake is introduced to water under high speed mixing or homogenization. The water may optionally contain a suspension agent or dispersant. The slurry of monoalkali metal cyanurate is produced after mixing for a prerequisite time.

A second embodiment is another method for preparing a slurry of a monoalkali metal cyanurate in water. It was surprisingly found that cyanuric acid wetcake could be dry-blended with a solid monoalkali metal base at room temperature to yield a monoalkali metal cyanurate directly. This avoided the need for making a cyanuric acid slurry in water followed by reaction with a solution of a monoalkali metal base and the solid-liquid separation step. Thus, in this method, a cyanuric acid wetcake is mechanically blended with a solid monoalkali metal base to form a semi-dry solid cake. This solid is introduced to water under high speed mixing or homogenization. The water may optionally contain a suspension agent or dispersant. The slurry of a monoalkali metal cyanurate is produced after mixing for a prerequisite time.

A third embodiment is a method for preparing a dry, solid monoalkali metal cyanurate.

A fourth embodiment is a composition of a slurry of a monoalkali metal cyanurate in water produced by the methods of the first or second embodiments.

The present invention includes low viscosity, easily pourable slurrries of monoalkali metal cyanurates that are of practical value and use. While not wishing to be bound by theory, it is believed that the methods of the invention do not produce the needle-like monosodium cyanurate monohydrate crystals disclosed in the '177 patent to Jany. Rather, it is believed that the methods of the invention produce smaller, spherical crystals of monosodium cyanurate monohydrate that are too short or small to become tangled together. As a result, these sodium cyanurate slurries are of far lower viscosity than those of the '177 patent. To put these viscosity differences into perspective, the lowest viscosity slurry disclosed by the '177 patent is 50,000 mPa s, which is approximately 43,100 centiStokes when its density of 1.16 g/ml is taken into consideration. This viscosity would be typical of that measured for tomato catsup at room temperature. The highest viscosity slurry reported by the '177-patent is 500,000 mPa s, approximately 430,000 centiStokes, which would be typical of that measured for peanut butter at room temperature. In contrast, the viscosity of the monoalkali metal cyanurate slurry of the present invention is about 100 centiStokes or 116 mPa s, which would be typical of that measured for light motor oil at room temperature.

DETAILED DESCRIPTION OF THE INVENTION

1. Method for Preparing a Slurry of a Monoalkali Metal Cyanurate Using a Monoalkali Metal Base.

This is a method for preparing a slurry of a monoalkali metal cyanurate in water. The method includes the following steps:

(a) Dispersing cyanuric acid or cyanuric acid wetcake into water to form a slurry.

The cyanuric acid may be dry, virgin material or it may be a by-product from using trichloroisocyanuric acid or sodium dichloroisocyanurate as a chemical reactant. When by-product material is used, it is generally available as a water-washed wetcake separated from the reaction liquors by any conventional solid-liquid separation technique, e.g., centrifugation, filtration, using a hydrocyclone, or by gravitational sedimentation. The amount of water in the wetcake is usually in the range of about 20-40% by weight. A slurry is made of the cyanuric acid or cyanuric acid wetcake by mixing it into water using any conventional device such as a stirred reactor. The slurry contains about 10-30% by weight solid cyanuric acid.

(b) Mixing the slurry and adding a stoichiometric amount of a monoalkali metal base to neutralize the cyanuric acid and form a monoalkali metal cyanurate.

Any suitable salt of a monoalkali metal base can be used. Examples include sodium hydrogen carbonate, sodium carbonate, sodium hydroxide, potassium hydroxide, potassium hydrogen carbonate, and potassium carbonate, and solutions thereof. The monoalkali metal base is added slowly while monitoring the pH of the solution. As soon as the base is introduced, the pH of the solution will spike to an elevated level of about 9 to about 11. Then the pH will start to fall as the cyanuric acid is neutralized by the base. When all the base has been introduced, the pH of the solution is between about 6 and about 9, signaling that the cyanuric acid has been converted to monoalkali metal cyanurate.

(c) Separating the monoalkali metal cyanurate from the slurry as a wetcake.

The monoalkali metal cyanurate is separated from the slurry as a wetcake. Any conventional solid-liquid separation technique can be used to accomplish the separation, e.g., centrifugation, filtration, using a hydrocyclone, or by gravitational sedimentation. The wetcake contains about 40-90% solid monoalkali metal cyanurate by weight.

(d) Introducing the monoalkali metal cyanurate wetcake to water under conditions of high speed mixing or homogenization to form a low viscosity slurry.

Any high speed mixing or homogenization processing equipment may be used as long as it breaks up the monoalkali metal cyanurate solid into small particles. Examples include an in-line homogenizer with a rotor and stator, a batch homogenizer with a rotor and stator, a colloid mill, and a dispersion mixer with a Cowles blade mixing head. The resultant slurry of a monoalkali metal cyanurate contains about 20-50% solids by weight.

The water may optionally contain a suspension agent or dispersant, in an amount to increase the viscosity of the aqueous phase. Any suitable dispersant or suspension agent may be used. Examples include naturally occurring polymers such as gelatin, xanthan gum, and guar gum; derivatized naturally occurring polymers such as hydroxmethylpropyl cellulose and hydroxyethyl cellulose; polyethylene glycols; associative thickeners such as synthetic polyacrylic acids; and inorganic rheology modifiers such as clays, silicas, and alumina oxides.

EXAMPLES 1-4

Cyanuric acid wetcake was determined to contain 71% w/w solids by taking 50.0 g and microwaving on high until there was no more loss in weight. A 2.5 gallon tank was charged with water (2365 g) and mixed using a Dayton AC-DC, series Model 2MO33A overhead mixer (1.2 Amp, 60 Hz., 5000 rpm). Then the cyanuric acid wetcake (473 g) was introduced. The pH of the slurry was measured to be 3.4. With mixing, a solution of 50% sodium hydroxide (205.3 g) was gradually introduced to the slurry. The final pH was initially measured to be 9.7, but this fell to 7.7 within a few minutes. Mixing was discontinued, and the resulting slurry of monosodium cyanurate was vacuum-filtered to produce 890.5 g of wetcake. Water (753.5 g) was placed in a Proctor-Silex kitchen blender and xanthan gum (2.85 g) was added. The blender was set at Chop for a few minutes, after which the gum had fully dissolved. Then the monosodium cyanurate wetcake was introduced to the blender which was then set at Liquefy for a few minutes. The resulting white monosodium cyanurate slurry (pH 7.37) was of sufficiently low viscosity that it could be quickly and easily poured from the blender into a gallon jug.

The process was repeated twice more as detailed in Table I. In Example 2, the xanthan gum was, replaced with a smectite clay (12.42 g) (Van Gel 'O' from R.T. Vanderbilt Co., Norwalk, Conn.) which was prehydrated with the water before introducing the sodium cyanurate wetcake. In Example 3, the amount of xanthan gum was reduced compared to Example 1. Example 4 represents a scale-up.

TABLE I

| Ex. | CA wetcake % Solid | Wt. CA wetcake/g | Wt. Water/g | Wt. 50% NaOH/g | Wt. NaCA Wetcake recovered/g | Wt. Water/g | Wt. Xanthan gum/g | Final pH |
|---|---|---|---|---|---|---|---|---|
| 1 | 71 | 473 | 2365 | 205.3 | 890.5 | 753.5 | 2.85 | 7.37 |
| 2 | 70 | 455 | 2276 | 197.5 | 872.5 | 742.4 | None* | — |
| 3 | 70 | 513.6 | 1797.6 | 222.9 | 952.3 | 871.1 | 1.6 | 7.27 |
| 4 | 71 | 1000 | 3550 | 440.3 | 1965.7 | 1635.7 | 3.067 | — |

*smectite clay (12.42 g) was used instead of xanthan gum

The gallon jugs of Examples 2 and 4 were taken to a residential swimming pool of 20,000 gallons estimated volume. The water temperature was 76° F. The sample of Example 2 was mildly shaken and then using a single motion, poured into the 8 foot deep end of the pool near the return pipe from the pump where the turbulence was high. The monosodium cyanurate dispersed through the water as a white cloud which then quickly disappeared as it dissolved. However, as the jug was near emptying, some monosodium cyanurate solids that had settled to the bottom of the container were discharged to the water. These did not quickly dissolve, but fell as a clump to the bottom of the deep end. Next the gallon jug of Example 4 was emptied into the pool in the same vicinity and same manner. Again, the monosodium cyanurate dispersed through the water as a white cloud which then quickly disappeared as it dissolved. This time, however, no solids had settled at the bottom of the container, and the jug emptied smoothly and uniformly. The jug was rinsed clean with two aliquots of pool water.

2. Method for Preparing a Slurry of a Monoalkali Metal Cyanurate Using a Monoalkali Metal Base Without the Need for a Solid-Liquid Separation Step.

The second embodiment is a method for preparing a slurry of a monoalkali metal cyanurate in water without the need for a solid-liquid separation step. The method includes the following steps:

(a) Blending cyanuric acid or cyanuric acid wetcake with a monoalkali metal base to form a wetcake of a monoalkali metal cyanurate.

The cyanuric acid may be dry, virgin material or it may be a by-product from another manufacturing process using trichloroisocyanuric acid or sodium dichloroisocyanurate as a chemical reactant. When by-product material is used, it is generally available as a water-washed wetcake separated from the reaction liquors by any conventional solid-liquid separation technique, e.g., centrifugation, filtration, using a hydrocyclone, or by gravitational sedimentation. The amount of water in the wetcake is usually in the range of about 20-40% by weight. Preferably, the wetcake is blended with a dry, solid monoalkali metal base such as sodium hydroxide, sodium hydrogen carbonate, sodium carbonate, potassium hydroxide, potassium hydrogen carbonate, or potassium carbonate. Even more preferably, the wetcake is blended with dry, solid sodium hydroxide or potassium hydroxide.

Because of its availability as small microbeads, sodium hydroxide is the most preferred monoalkali metal base.

When the cyanuric acid is dry, virgin material, sufficient water may be added so that it can be processed as if it were cyanuric acid wetcake. Alternatively, it may be blended with an aqueous solution of a monoalkali metal base such as a solution of sodium hydroxide, sodium hydrogen carbonate, sodium carbonate, potassium hydroxide, potassium hydrogen carbonate, or potassium carbonate. Preferably, the dry virgin cyanuric acid is blended with a solution of sodium hydroxide or potassium hydroxide because they are stronger bases and react more rapidly.

Any blending equipment can be used to blend the cyanuric acid or cyanuric acid wetcake with the monoalkali metal base to form a cake of monoalkali metal cyanurate. Suitable examples include a ribbon and paddle blender, a V and double-cone blender, a Nauta screw mixer, and a rotating cement mixer. Alternatively, the reactants may be blended by milling using a pulveriser mill, a ball mill, a hammer mill, a pin mill, an air mill, or a roller mill.

(b) Introducing the monoalkali metal cyanurate wetcake to water under conditions of high speed mixing or homogenization to form a low viscosity slurry.

Any high speed mixing or homogenization processing equipment may be used as long as it breaks up the monoalkali metal cyanurate solid into smaller particles. Examples include an in-line homogenizer with a rotor and stator, a batch homogenizer with a rotor and stator, a colloid mill, and a dispersion mixer with a Cowles blade mixing head. The resultant slurry of monosodium cyanurate contains about 20-50% solids by weight.

The water may optionally contain a dispersant or suspension agent in an amount to increase the viscosity of the aqueous phase. Any suitable dispersant or suspension agent may be used. Examples include naturally occurring polymers such as gelatin, xanthan gum, and guar gum; derivatized naturally occurring polymers such as hydroxmethylpropyl cellulose and hydroxyethyl cellulose; polyethylene glycols; associative thickeners such as synthetic polyacrylic acids; and inorganic rheology modifiers such as clays, silicas, and alumina oxides.

EXAMPLE 5

A cyanuric acid wetcake (181.7 g) having a solids content of 71% was placed in a crystallizing dish followed by adding solid sodium hydroxide microbeads (10 g). A broad-bladed spatula was used to blend the mixture rather like a cook might blend butter into flour. After a few minutes the initial exotherm had cooled and another amount of solid sodium hydroxide microbeads (10 g) was added. This was repeated until all the sodium hydroxide (40 g total) was blended into the product. Spatula blending continued for an additional 10 minutes whereupon a sample of the product was inspected under a stereomicroscope at three-fold magnification. The sodium hydroxide microbeads were not apparent anywhere in the product indicating that they had been taken up by the water in the wetcake, and then reacted to form a wetcake of monosodium cyanurate. Water (299.6 g) was placed in a Proctor-Silex kitchen blender and xanthan gum (0.44 g) was added. The blender was set at Chop for a few minutes, after which the gum had fully dissolved. Then the monosodium cyanurate cake was introduced into the blender which was then set to Liquefy for a few minutes. The resulting white monosodium cyanurate slurry was of sufficiently low viscosity that it could be easily poured from the blender into a plastic pint bottle. The pH of the slurry was 8.18. Using Gardo EZ Zain Viscosity Cups (Paul N. Gardner Co., Pompano Beach, Fla.), the viscosity was measured to be 83 centistokes with cup #4 and 127 centistokes with cup #5. The pint bottle containing the monosodium cyanurate slurry was placed on the platform of Buffalo 200 dental vibrator (Buffalo Dental Manufacturing Co., Syosset, N.Y.). This was programmed to continuously vibrate for 10 minutes and then turn off for 30 minutes. After a cycle time of 18 hours, no water separation layer had developed. Surprisingly, solids had not compacted at the bottom of the container and the slurry poured freely from the bottle.

EXAMPLE 6

The procedure of Example 5 was repeated except no xanthan gum was used and the final pH was 7.11. The pint sample was placed on the vibratory platform set to the same cycle time. After three hours, a water layer of about 20% of the total volume had developed.

EXAMPLE 7

A cyanuric acid wetcake (171.5 g) having a solids content of 75.2% was placed in a crystallizing dish followed by solid potassium hydroxide flakes (14 g). A broad-bladed spatula was used to blend the mixture rather like a cook might blend butter into flour. As it was being blended the color of the cyanuric acid wetcake changed from creamy white to purple-gray. After a few minutes the initial exotherm had cooled and another amount of solid potassium hydroxide flakes (10 g) was added. This was repeated until all the potassium hydroxide (56 g total) was blended into the product. Spatula blending continued for an additional 10 minutes until the purple-gray color appeared to be evenly distributed throughout the blend and no more creamy white coloration remained. A sample of the product was inspected under a stereomicroscope at three-fold magnification. The potassium hydroxide flakes were not apparent anywhere in the product indicating that they had been taken up by the water in the wetcake and then reacted to form a cake of monopotassium cyanurate. Water (276.6 g) was placed in a Proctor-Silex kitchen blender and xanthan gum (0.367 g) was added. The blender was set at Chop for a few minutes, after which the gum had fully dissolved. Then the monopotassium cyanurate cake was introduced to the blender which was then set to Liquefy for a few minutes. The resulting white monopotassium cyanurate slurry was of sufficiently low viscosity that it could be poured from the blender into a plastic pint bottle. The pH of the slurry was 7.12. Using Gardo EZ Zahn Viscosity Cups (Paul N. Gardner Co., Pompano Beach, Fla.) the viscosity was measured to be 98 centistokes with cup #4 and 115.9 centistokes with cup #5. The pint bottle containing the monopotassium cyanurate slurry was placed on the vibratory platform that was programmed to continuously vibrate for 10 minutes and then turn off for 30 minutes. After a cycle time of 15 hours, the product had developed a water separation layer of about 15% of the total product volume.

3. Method for Preparing a Dry, Solid Monoalkali Metal Cyanurate.

The third embodiment is a method for preparing a dry solid monoalkali metal cyanurate. The method includes the following steps:

(a) Blending cyanuric acid or cyanuric acid wetcake with a monoalkali metal base to form a wetcake of a monoalkali metal cyanurate.

The cyanuric acid may be dry, virgin material or it may be a by-product from another manufacturing process using trichloroisocyanuric acid or sodium dichloroisocyanurate as a chemical reactant. When by-product material is used, it is generally available as a water-washed wetcake separated from the reaction liquors by any conventional solid-liquid separation technique, e.g., centrifugation, filtration, using a hydrocyclone, or by gravitational sedimentation. The amount of water in the wetcake is usually in the range of about 20-40% by weight. Preferably, the wetcake is blended with a dry, solid monoalkali metal base such as sodium hydroxide, sodium hydrogen carbonate, sodium carbonate, potassium hydroxide, potassium hydrogen carbonate, or potassium carbonate. Even more preferably, the wetcake is blended with dry, solid sodium hydroxide or potassium hydroxide. Because of its availability as small microbeads, sodium hydroxide is the most preferred monoalkali metal base.

When the cyanuric acid is dry, virgin material, sufficient water may be added so that it can be processed as if it were cyanuric acid wetcake. Alternatively, it may be blended with an aqueous solution of a monoalkali metal base such as a solution of sodium hydroxide, sodium hydrogen carbonate, sodium carbonate, potassium hydroxide, potassium hydrogen carbonate, or potassium carbonate. Preferably, the dry virgin cyanuric acid is blended with a solution of sodium hydroxide or potassium hydroxide because they are stronger bases and react more rapidly.

Any blending equipment can be used to blend the cyanuric acid or cyanuric acid w wetcake with the monoalkali metal base to form a cake of monoalkali metal cyanurate. Suitable examples include a ribbon and paddle blender, a V and double-cone blender, a Nauta screw mixer, and a rotating cement mixer. Alternatively, the reactants may be blended by milling using a pulveriser mill, a ball mill, a hammer mill, a pin mill, an air mill, or a roller mill.

(b) Drying the monoalkali metal cyanurate wetcake.

Any suitable drying method can be used. Examples include the use of a fluidized bed dryer, a flash dryer, a double-cone vacuum tumble dryer, a rotating circular tray dryer (e.g. from Wyssmont Co., Fort Lee, N.J.), and an atmospheric tray dryer.

PROSPECTIVE EXAMPLE 8

A production-scale batch of monoalkali metal cyanurate is prepared and used as follows.

Cyanuric acid wetcake (1405 lb) containing 66% solids is introduced to a 50 cubic foot stainless steel ribbon blender powered by dual 15 HP motors. Soft water (43.9 lb) is added while mixing in the blender. With further blending, solid sodium hydroxide microbeads (288.3 lb) are introduced over a three-minute period. The mixture becomes very hot as evidenced by the large amount of steam that escapes the reaction mixture into the atmosphere. The outside skin of the ribbon blender becomes too hot to touch and a temperature of 130° F. is measured with a digital infrared thermometer. After blending for 20 minutes, the entire contents of the ribbon blender is admitted to a Wyssmont Turbo Dryer (Wyssmont Company, Inc., Fort Lee, N.J.) where it is dried. The resultant monosodium cyanurate is then packaged into a supersack. Using a scoop, some of the monosodium cyanurate (5.85 lb) is removed, placed in a pail and transported to a swimming pool. With the recirculation pump running, the contents of the pail are added to the 8 foot deep end of a 20,000 gallon swimming pool close to the pool return where the turbulence is maximum. Within 30 minutes, all of the monosodium cyanurate is dissolved. The pool water is allowed to recirculate for 4 hours. A Hach DR 700 colorimeter equipped with a 500 nm filter module and programmed to run. Hach Method 8139 is used to measure an increase in the pool water cyanuric acid level of 30 ppm.

4. Slurry Composition of a Monoalkali Metal Cyanurate.

The monoalkali metal cyanurate slurry of the present invention is characterized as having a solids content of about 20%-about 50% w/w, a pH of about 6 to about 10, a viscosity of less than about 40,000 centiStokes, a mean particle size of less than about 30 μm, and about 90% v/v of its particles less than about 55 μm in size. In addition, the monoalkali metal cyanurate slurry is pourable into and out of a container; does not settle or compact to a hard mass at the bottom of the container; does not readily dewater (separate) in the container; disperses and dissolves readily in water; and is inexpensive and easy to manufacture.

EXAMPLE 9

A cyanuric acid wetcake (579.3 g) having a solids content of 66.8% was placed into a kitchen mixing followed by adding solid sodium hydroxide microbeads (40 g). A broad-bladed spatula was used to blend the mixture rather like a cook might blend butter into flour. After a few minutes the initial exotherm had cooled, and another amount of solid sodium hydroxide microbeads (40 g) was added. This was repeated until all the sodium hydroxide (120 g total) was blended into the product. Spatula blending continued for a further 10 minutes to produce a monosodium cyanurate wetcake. Water (810.6 g) was placed in a Proctor-Silex kitchen blender and xanthan gum (1.29 g) was added. The blender was set at Chop for a few minutes, after which the gum had fully dissolved. Then the monosodium cyanurate wetcake was introduced into the blender which was then set to Liquefy for 7 minutes. The pH of the resultant white slurry was 6.96. Using Gardo EZ Zahn Viscosity Cups (Paul N. Gardner Co., Pompano Beach, Fla.) the viscosity was estimated to be 131 centistokes with cup #4 and 13 centistokes with cup #5. This was of sufficiently low viscosity that it could be easily poured from the blender into a one-gallon plastic jug. Another two batches of slurry were prepared in identical fashion and poured into the same one-gallon jug to almost fill it.

A one-gallon jug of Instant Pool Water Conditioner (Natural Chemistry Inc. of Norwalk, Conn.) was purchased from a local pool store. This, and the one gallon of monosodium cyanurate prepared above, were taken to an outdoor swimming pool. The jug of Instant Pool Water Conditioner was opened, and a layer of separated water was noticed. Approximately two liters of clear water, or around half the total volume of the jug, was poured into a glass beaker until no more liquid would come out. The water was poured back into the jug which was then capped and inverted several times in an attempt to redisperse the settled solids into the water. The bottle was then opened and the contents were poured into the 8-foot deep end of the pool close to the pool return for maximum turbulent mixing. At first only small amount of slurry was discharged from the jug and into the water, despite the jug having a 3 inch diameter opening. The bottle was recapped and shaken vigorously before continuing the addition. The solids had compacted into a large mass at the bottom of the jug making it difficult to discharge much more product the during the second addition. Vigorous shaking with repeated addition was continued. Eventually the bottle emptied with a large slug of semi-solid mass falling out the jug and settling to the bottom of the pool. Using a pool brush, the undissolved mass was swept to the shallow end of the pool to clear the area for the addition of the one gallon sample of monosodium cyanurate of the present invention. When this jug was opened, there was no noticeable water layer of separated water. When the product was poured into a glass beaker, a homogenous white liquid emerged. It was returned to the jug once two liters had been poured out. The jug was then capped and inverted several times exactly as was done for Instant Water Pool Conditioner before it was poured into the pool through the jug's 1.25 inch diameter opening. Despite the smaller opening, then entire contents of the jug were completely discharged in a single pour. As the monosodium cyanurate slurry entered the water, it dispersed and dissolved rapidly and only about 5% of the product reached the bottom of the pool where it lay as a thin layer. Using a pool brush, the undissolved material was readily dispersed and dissolved with a sweeping action. The empty container was cleaned with a single rinse of pool-water.

EXAMPLE 10

The Instant Water Pool Conditioner referred to in Example 9 was vigorously shaken in order to redisperse the solids. Using Gardo EZ Zahn Viscosity Cups (Paul N. Gardner Co., Pompano Beach, Fla.), the viscosity was measured to be 54.6 centistokes with cup #4 and 99.7 centistokes with cup #5. The Instant Pool Water Conditioner was then placed in a Proctor-Silex kitchen blender and turned to the Liquefy setting for 6 minutes. Upon de-aeration, the mixture appeared even thicker than before it was blended. This was confirmed with the drain cup measurements when the material failed to drain through both cup #4 and cup #5. A one-quart bottle of Instant Pool Water Conditioner was placed on the vibratory platform that was programmed to continuously vibrate for 10 minutes and then turn off for 30 minutes. After a cycle time of 24 hours, the slurry had developed a water separation layer of about 25% of the total product volume, increasing to about 33% another 12 hours later. The solids had compacted into a dense mass in the bottle that could not be poured out without vigorous manual shaking to redisperse it.

EXAMPLE 11

A production-scale batch of monoalkali metal cyanurate slurry was prepared as follows.

Cyanuric acid wetcake (1405 lb) containing 66% solids was introduced to a 50 cubic foot stainless steel ribbon blender powered by dual 15 HP motors. Soft water (43.9 lb) was added while mixing in the blender. With further mixing, solid sodium hydroxide microbeads (288.3 lb) were introduced over a three-minute period. The mixture became very hot as evidenced by the large amount of steam that escaped the reaction mixture into the atmosphere. The outside skin of the ribbon blender became too hot to touch and a temperature of 130° F. was measured with a digital infrared thermometer.

Soft water (1830 lb, 219.7 gallons) was charged to a baffled, cone-bottom, plastic mixing tank. A Ross HSD 30 high-speed dispersion mixed equipped with a 16 inch dispersion blade and powered with a 30HP motor was used to mix the water as xanthan gum (4.04 lb) was introduced. Next, a preservative, KTND (a mixture of 2-methyl-4-isothiazolin-3-one (0.35%) and 5-chloro-2-methyl-4-isothiazolin-3-one (1.15%)) (2.72 lb) was added. After 15 minutes of mixing, the entire contents of the ribbon blender were manually introduced to the mix tank. After 30 minutes, an addition of 50% NaOH (5 lb) was used to bring the pH to 8.3. Mixing was continued for a further 1½ hours whereupon the suspension was pumped from the mix tank to a 375-gallon tote for subsequent packaging into one-gallon plastic jugs.

EXAMPLE 12

A slurry of Instant Pool Water Conditioner as referred to in Example 9 along with a sample of the material prepared in Example 11 were subject to particle size distribution measurements. A Malvern Instruments (Southborough, Mass.) laser diffraction particle size analyzer employed a modified ASTM D4464 technique in which the particles of each slurry were dispersed in a non-polar liquid phase in a sample chamber. A laser light source was used to illuminate the particles and the light scattered by the particles was detected by a series of photodetectors situated at different angles to the sample chamber. The intensity of the light impacting the photodetectors is measured as a function of angle. This is then subject to a mathematical analysis using a complex inversion matrix algorithm. The result is a particle size distribution displayed as a volume % in discrete size classes. Table II shows the results obtained for Example 11 and Instant Pool Water Conditioner.

TABLE II

| Particle Size Distribution | Example 11 | Instant Pool Water Conditioner |
|---|---|---|
| 10% v/v is less than | 3.1 μm | 2.7 μm |
| 50% v/v is less than | 20.9 μm | 20.8 μm |
| 90% v/v is less than | 53.2 μm | 128.9 μm |
| Mean particle size | 29.9 μm | 44.5 μm |

The monoalkali metal cyanurate slurry of Example 11 has a far smaller mean particle size (29.9 μm) compared to that of the Instant Pool Water Conditioner (44.5 μm). In addition, 90% v/v of the monoalkali metal cyanurate particles of Example 11 are below 53.2 μm, whereas for Instant Pool Water Conditioner, 90% v/v of the particles are below 128.9 μm.

The invention has been described above with reference to the preferred embodiments. Those skilled in the art may envision other embodiments and variations of the invention that fall within the scope of the claims.

We claim:

1. A method for preparing a slurry of a monoalkali metal cyanurate, comprising:
    (a) Blending cyanuric acid wetcake with a monoalkali metal base to form a wetcake of a monoalkali metal cyanurate without dispersing the cyanuric acid wetcake in an aqueous medium prior to blending; and
    (b) Introducing said monoalkali metal cyanurate wetcake to water, under high speed mixing, to form a slurry of a monoalkali metal cyanurate having a viscosity of less than 131 centiStokes, wherein said water contains a suspension agent in an amount sufficient to increase its viscosity.

2. The method of claim 1, wherein said monoalkali metal base is selected from the group consisting of dry, solid sodium hydroxide, sodium hydrogen carbonate, sodium carbonate, potassium hydroxide, potassium hydrogen carbonate, and potassium carbonate.

3. The method of claim 1, wherein said monoalkali metal base is selected from the group consisting of aqueous solutions of sodium hydroxide, sodium hydrogen carbonate, sodium carbonate, potassium, hydroxide, potassium hydrogen carbonate, and potassium carbonate.

4. The method of claim 1, wherein said suspension agent is selected from the group consisting of a naturally occurring polymer; a derivatized naturally occurring polymer; polyethylene glycols; synthetic polyacrylic acids; and inorganic rheology modifiers.

5. The method of claim 4, wherein said suspension agent is a naturally occurring polymer, and further, wherein said naturally occurring polymer is xanthan gum.

6. A monoalkali metal cyanurate slurry prepared according to the method of claim 1.

7. A method for preparing a dry, solid monoalkali metal cyanurate, comprising:
   (a) Blending cyanuric acid wetcake with a monoalkali metal base to form a wetcake of a monoalkali metal cyanurate without dispersing the cyanuric acid wetcake in an aqueous medium prior to blending; and
   (b) Drying said monoalkali metal cyanurate wetcake.

8. The method of claim 7, wherein said monoalkali metal base is selected from the group consisting of dry, solid sodium hydroxide, sodium hydrogen carbonate, sodium carbonate, potassium hydroxide, potassium hydrogen carbonate, and potassium carbonate.

9. The method of claim 7, wherein said monoalkali metal base is selected from the group consisting of aqueous solutions of sodium hydroxide, sodium hydrogen carbonate, sodium carbonate, potassium hydroxide, potassium hydrogen carbonate, and potassium carbonate.

10. A method for preparing a slurry of a monoalkali metal cyanurate, comprising:
    (a) Forming a wetcake of monoalkali metal cyanurate by blending cyanuric acid or cyanuric acid wetcake with a monoalkali metal base; and
    (b) Introducing the formed wetcake of monoalkali metal cyanurate to water, under high speed mixing, to form a slurry of a monoalkali metal cyanurate.

11. A method for preparing a dry, solid monoalkali metal cyanurate, comprising:
    (a) Forming a wetcake of monoalkali metal cyanurate by blending cyanuric acid or cyanuric acid wetcake with a monoalkali metal base; and
    (b) Drying the formed wetcake of monoalkali metal cyanurate.

12. A method for preparing a dry, solid monoalkali metal cyanurate, comprising:
    (a) Forming a wetcake of monoalkali metal cyanurate by blending cyanuric acid or cyanuric acid wetcake with a monoalkali metal base; and
    (b) Drying the formed wetcake of monoalkali metal cyanurate by allowing heat of neutralization caused by a reaction of the blended cyanuric acid or cyanuric acid wetcake and the monoalkali metal base to remove water from the monoalkali metal cyanurate wetcake as steam and by allowing the steam to escape.

* * * * *